United States Patent
Lum et al.

(10) Patent No.: US 8,600,316 B2
(45) Date of Patent: Dec. 3, 2013

(54) WIRELESS CIRCUITS WITH MINIMIZED PORT COUNTS

(75) Inventors: Nicholas W. Lum, Santa Clara, CA (US); Ronald W. Dimpflmaier, Los Gatos, CA (US); Louie J. Sanguinetti, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 212 days.

(21) Appl. No.: 13/080,588

(22) Filed: Apr. 5, 2011

(65) Prior Publication Data

US 2011/0319035 A1    Dec. 29, 2011

Related U.S. Application Data

(60) Provisional application No. 61/359,263, filed on Jun. 28, 2010.

(51) Int. Cl.
*H04B 1/44* (2006.01)
*H04M 1/00* (2006.01)

(52) U.S. Cl.
USPC .................. 455/78; 455/550.1; 455/552.1

(58) Field of Classification Search
USPC ............. 455/73, 78, 80, 82, 83, 550.1, 552.1, 455/553.1
See application file for complete search history.

(56) References Cited

U.S. PATENT DOCUMENTS

| | | | |
|---|---|---|---|
| 7,177,663 B2 * | 2/2007 | Axness et al. | 455/552.1 |
| 7,376,446 B2 * | 5/2008 | Licht | 455/561 |
| 7,379,430 B2 | 5/2008 | Duplessis et al. | |
| 7,398,060 B2 | 7/2008 | Frank | |
| 7,515,929 B2 | 4/2009 | Ramachandran et al. | |
| 2004/0209590 A1 * | 10/2004 | Forrester et al. | 455/324 |
| 2006/0067254 A1 * | 3/2006 | Mahbub et al. | 370/282 |
| 2006/0158281 A1 * | 7/2006 | Garris et al. | 333/133 |
| 2008/0240000 A1 * | 10/2008 | Kidd | 370/275 |
| 2009/0147805 A1 * | 6/2009 | Wada | 370/497 |
| 2009/0209283 A1 | 8/2009 | Yang et al. | |
| 2009/0233642 A1 * | 9/2009 | Zhitnitsky | 455/552.1 |
| 2009/0285135 A1 * | 11/2009 | Rousu et al. | 370/297 |
| 2010/0238844 A1 * | 9/2010 | Kanou | 370/278 |
| 2011/0110385 A1 * | 5/2011 | Gorostegui et al. | 370/497 |
| 2011/0158081 A1 * | 6/2011 | Wang et al. | 370/201 |
| 2011/0305174 A1 * | 12/2011 | Hensley et al. | 370/297 |
| 2012/0269136 A1 * | 10/2012 | Seo et al. | 370/329 |

* cited by examiner

*Primary Examiner* — Andrew Wendell
(74) *Attorney, Agent, or Firm* — Treyz Law Group; G. Victor Treyz; David C. Kellogg

(57) ABSTRACT

An electronic device has wireless communications circuitry including a triplexer. The wireless communications circuitry may be used in first and second modes. In the first mode, the device communicates in a first communications band using a transmitter in a first uplink frequency range associated with the first communications band and using a receiver in a first downlink frequency range associated with the first communications band. In the second mode, the device communicates in a second communications band using a transmitter to transmit in a second uplink frequency range associated with the second communications band and using the receiver to receive in a second downlink frequency range associated with the second communications band. Signals in the two downlink frequency ranges may pass through a common bandpass filter in the triplexer. Two additional bandpass filters in the triplexer may be used to respectively handle the two uplink frequency ranges.

19 Claims, 3 Drawing Sheets

WIRELESS CIRCUITS WITH MINIMIZED PORT COUNTS

This application claims the benefit of provisional patent application No. 61/359,263, filed Jun. 28, 2010, which is hereby incorporated by reference herein in its entirety.

BACKGROUND

This relates generally to wireless communications circuitry, and more particularly, to circuitry in wireless electronic devices helps reduce port counts in radio-frequency circuits.

Electronic devices such as computers and cellular telephones are often provided with wireless communications capabilities. For example, electronic devices may use long-range wireless communications circuitry such as cellular telephone circuitry to communicate using cellular telephone bands. As spectrum is allocated to support new wireless services, it is becoming desirable for the wireless circuitry in electronic devices to support additional communications bands. For example, as new spectrum becomes available, electronic devices may need to be developed to handle communications bands at frequencies in the new spectrum and at frequencies associated with legacy bands.

In devices with wireless circuitry that handles multiple communications bands, it is often desirable to share limited antenna resources among multiple communications bands. In a typical antenna sharing scheme, switching circuitry and filter circuitry can be used to selectively couple an antenna to different ports in a radio-frequency transceiver.

Although antenna sharing schemes reduce the need for numerous antennas, the switching circuitry and filter circuitry that is used in conventional antenna sharing schemes may be complex and bulky and may exhibit undesired radio-frequency signal losses.

It would therefore be desirable to be able to provide improved circuitry for routing signals between radio-frequency transceiver ports and antenna structures in a wireless electronic device.

SUMMARY

An electronic device may be provided with wireless communications circuitry. The wireless communications circuitry may include a radio-frequency transceiver for handling wireless communications. The radio-frequency transceiver may have multiple ports. The ports may be used for transmitting and receiving wireless signals such as cellular telephone signals.

The radio-frequency transceiver may include a transmitter that transmits radio-frequency signals in a first uplink frequency range associated with a first communications band and may include a receiver that receives radio-frequency signals in a first downlink frequency range associated with the first communications band. These operations may be performed while the electronic device is in a first mode of operation.

In a second mode, the device may communicate in a second communications band. The radio-frequency transceiver may include a transmitter that transmits signals in a second uplink frequency range associated with the second communications band and may use the receiver to receive signals in a second downlink frequency range associated with the second communications band.

Signals in the two downlink frequency ranges may pass through a common bandpass filter in a triplexer. Two additional bandpass filters in the triplexer may be used to respectively handle the two uplink frequency ranges.

Further features of the invention, its nature and various advantages will be more apparent from the accompanying drawings and the following detailed description of the preferred embodiments.

DETAILED DESCRIPTION

Figure 1:
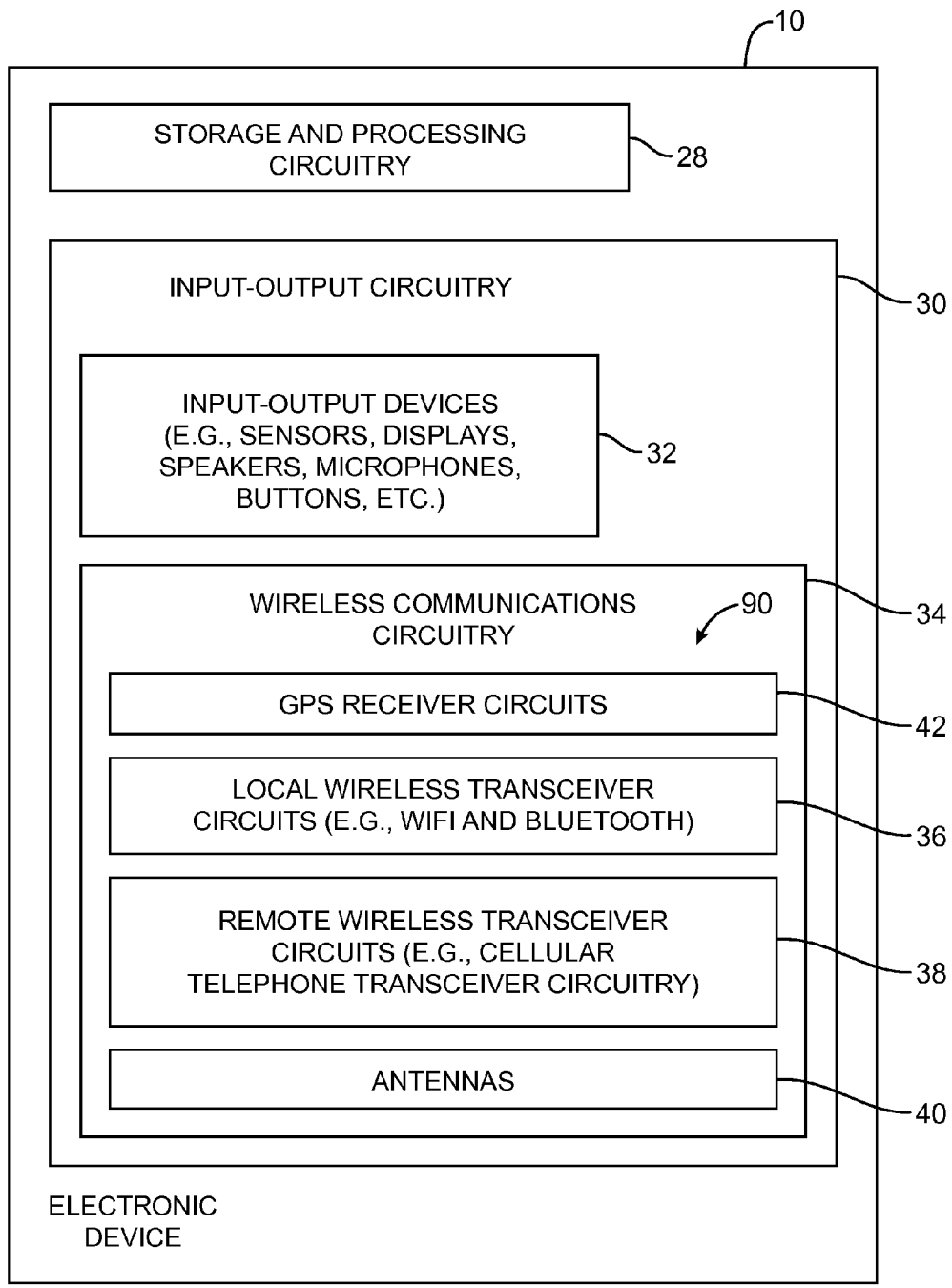
FIG. 1 is a schematic diagram of an illustrative electronic device with wireless communications circuitry in accordance with an embodiment of the present invention.

Electronic devices such as device 10 of FIG. 1 may be provided with wireless communications circuitry. The wireless communications circuitry may be used to support wireless communications such as long-range wireless communications (e.g., communications in cellular telephone bands) and short-range communications (i.e., local area network links such as WiFi® links, Bluetooth® links, etc.). Examples of long-range (cellular telephone) bands that may be handled by device 10 include the 800 MHz band, the 850 MHz band, the 900 MHz band, the 1800 MHz band, the 1900 MHz band, the 2100 MHz band, the 700 MHz band, and other bands. The long-range bands used by device 10 may include the so-called LTE (Long Term Evolution) bands. The LTE bands are numbered (e.g., 1, 2, 3, etc.) and are sometimes referred to as E-UTRA operating bands.

As shown in FIG. 1, device 10 may include storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. This processing circuitry may be based on one or more microprocessors, microcontrollers, digital signal processors, application specific integrated circuits, etc.

Storage and processing circuitry 28 may be used to run software on device 10, such as internet browsing applications, voice-over-internet-protocol (VOIP) telephone call applications, email applications, media playback applications, operating system functions, functions related to communications band selection during radio-frequency transmission and reception operations, etc. To support interactions with external equipment, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, cellular telephone protocols, MIMO (multiple input multiple output) protocols, antenna diversity protocols, etc. Wireless communications operations such as communications band selection operations may be controlled using software stored and running on device 10 (i.e., stored and running on storage and processing circuitry 28 and/or input-output circuitry 30).

Input-output circuitry 30 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices may include touch screens, displays without touch sensor capabilities, buttons, joysticks, click wheels, scrolling wheels, touch pads, key pads, keyboards, microphones, cameras, buttons, speakers, status indicators, light sources, audio jacks and other audio port components, digital data port devices, light sensors, motion sensors (accelerometers), capacitance sensors, proximity sensors, etc.

Input-output circuitry 30 may include wireless communications circuitry 34 for communicating wirelessly with external equipment. Wireless communications circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless communications circuitry 34 may include radio-frequency transceiver circuitry 90 for handling various radio-frequency communications bands. For example, circuitry 34 may include transceiver circuitry 36, 38, and 42. Transceiver circuitry 36 may handle 2.4 GHz and 5 GHz bands for WiFi® (IEEE 802.11) communications and may handle the 2.4 GHz Bluetooth® communications band. Circuitry 34 may use cellular telephone transceiver circuitry 38 for handling wireless communications in cellular telephone bands such as at 850 MHz, 900 MHz, 1800 MHz, 1900 MHz, and 2100 MHz and/or the LTE bands and other bands (as examples). Circuitry 38 may handle voice data and non-voice data.

Wireless communications circuitry 34 may include global positioning system (GPS) receiver equipment such as GPS receiver circuitry 42 for receiving GPS signals at 1575 MHz or for handling other satellite positioning data. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may include one or more antennas 40. Antennas 40 may be formed using any suitable antenna types. For example, antennas 40 may include antennas with resonating elements that are formed from loop antenna structure, patch antenna structures, inverted-F antenna structures, slot antenna structures, planar inverted-F antenna structures, helical antenna structures, hybrids of these designs, etc. Different types of antennas may be used for different bands and combinations of bands. For example, one type of antenna may be used in forming a local wireless link antenna and another type of antenna may be used in forming a remote wireless link antenna.

Figure 2:
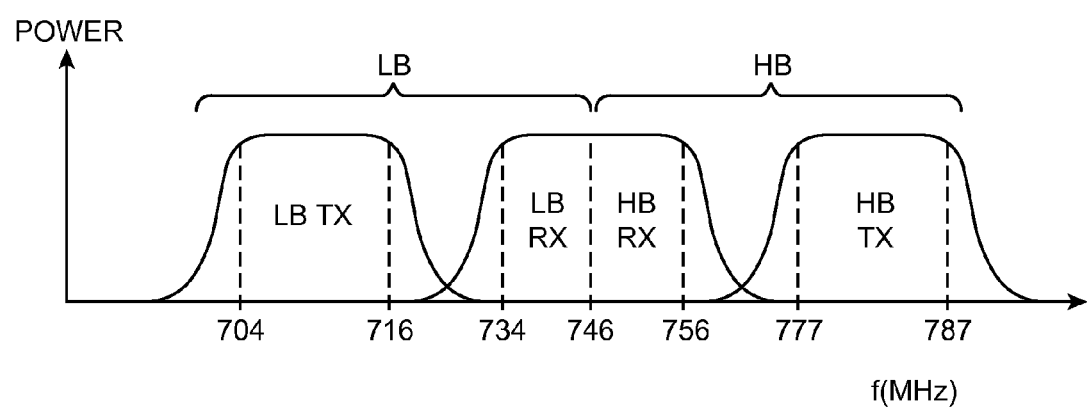
FIG. 2 is a graph of illustrative communications bands that may be handled using a device of the type shown in FIG. 1 in accordance with an embodiment of the present invention.

Transceiver circuitry 90 may be used to handle multiple cellular telephone bands. Some of the bands may be adjacent to one another. A graph of the cellular telephone wireless spectrum in the vicinity of two adjacent cellular telephone communications bands (called LB and HB) is shown in FIG. 2. Each of the communications bands has a downlink (RX) band and an uplink (TX) band. In the example of FIG. 2, band LB has an uplink band (also referred to as a band, sub-band, or frequency range) that ranges from 704 MHz to 716 MHz, and a downlink band (also referred to as a band, sub-band, or frequency range) that ranges from 734 to 746 MHz. Band HB has an uplink band (also referred to as a band, sub-band, or frequency range) that ranges from 777 MHz to 787 MHz and has a downlink band (also referred to as a band, sub-band, or frequency range) that ranges from 746 MHz to 756 MHz. Band HB may be, for example, LTE band 13 and band LB may be, for example, LTE band 17.

Because bands LB and HB (and, more particularly, the LB downlink band LB RX and the HB downlink band HB RX) are adjacent to one another, wireless circuitry 34 can be used to route signals associated with the LB downlink and the HB downlink bands onto a single transceiver port in transceiver circuitry 90. This allows the number of transceiver ports that are used in device 10 to be minimized without reducing cellular band coverage. The complexity of the switching circuitry and filter circuitry that is interposed between transceiver circuitry 90 and antenna structures 40 may also be minimized.

Figure 3:
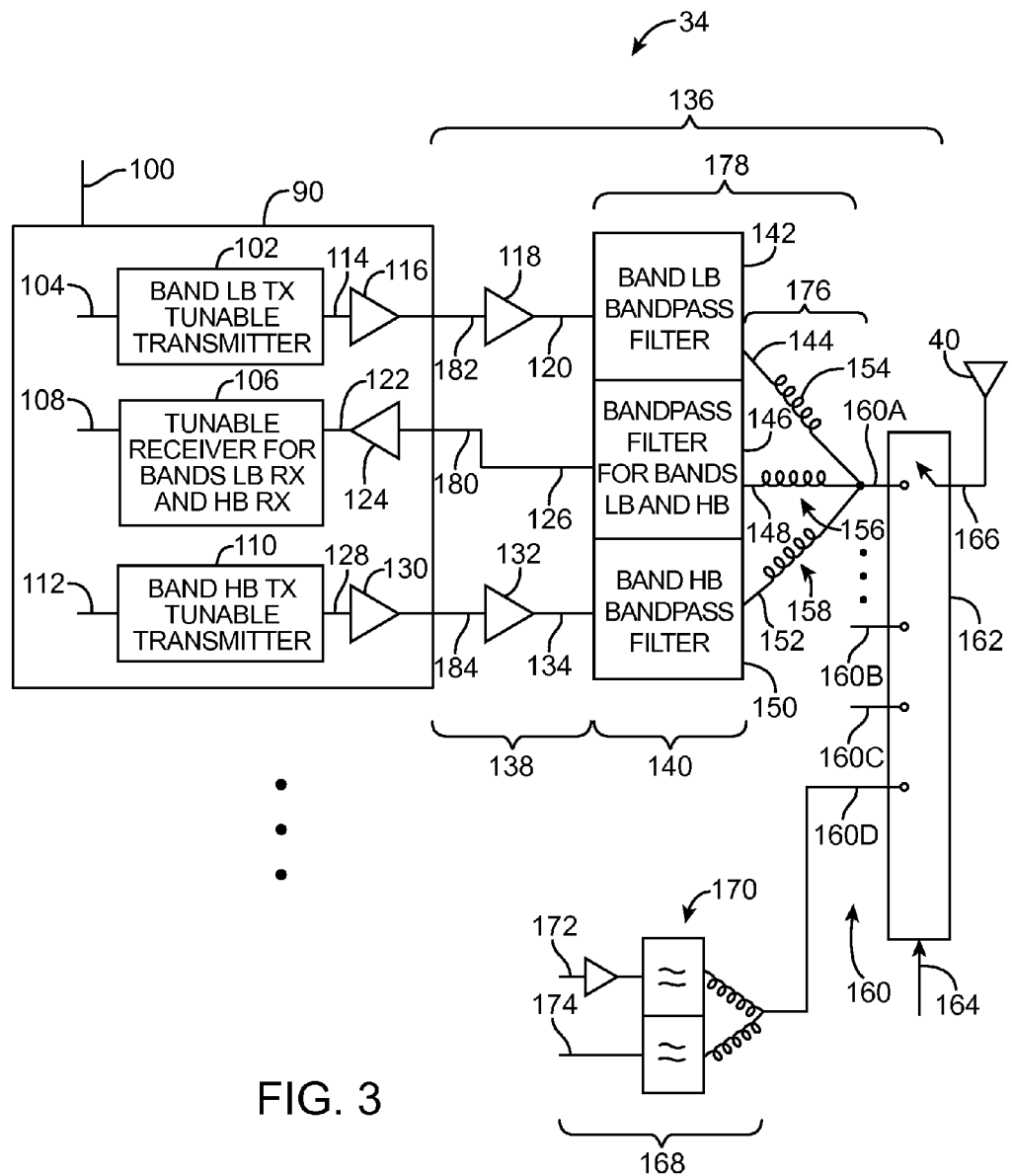
FIG. 3 is a circuit diagram of illustrative wireless communications circuitry of the type that may be used in handling the wireless communications bands of FIG. 2 in an electronic device of the type shown in FIG. 1 in accordance with an embodiment of the present invention.

Illustrative wireless circuitry 34 that may be used in device 10 of FIG. 1 to handle bands of the type shown in FIG. 2 and other bands is shown in FIG. 3. As shown in FIG. 3, wireless circuitry 34 may include radio-frequency transceiver 90 and antenna 40. Antenna 40 may be implanted using antenna structures that are formed from one or more antenna elements (i.e., one or more individual antennas). Transceiver 90 may be implemented using one or more transceiver integrated circuits or other transceiver circuitry.

Transceiver circuitry 90 may be coupled to other storage and processing circuitry 28 (e.g., baseband integrated circuits) via path 100. Data that is to be transmitted over antenna 40 using transmitters in transceiver circuitry 90 may be received via path 100. Data that is received from antenna 40 using receivers in transceiver circuitry 90 may be provided to storage and processing circuitry 28 via path 100.

Transceiver circuitry 90 may be coupled to antenna 40 using circuitry 136. Circuitry 136 may include filter circuitry, switching circuitry, impedance mating circuitry, amplifiers, and other electrical components.

As shown in FIG. 3, circuitry 136 may include optional amplifier circuitry 138 such as power amplifiers 118 and 132. Circuitry 136 may also include filter circuitry 178 and switching circuitry 162. Filter circuitry 178, which may sometimes be referred to as a triplexer or triplexer circuitry, may include filters 140 and radio-frequency coupling circuit (network) 176.

Transceiver 90 may include transmitters and receivers. For example, transceiver 90 may include transmitter 102 for handling radio-frequency signals in uplink band LB TX (e.g., 704-716 MHz in the FIG. 2 example) and transmitter 110 for handling radio-frequency signals in uplink band HB TX (e.g., 777-787 MHz in the FIG. 2 example). Transmitter 102 may include tuning circuitry for tuning to a desired transmit channel in band LB TX. Transmitter 110 may include tuning circuitry for tuning to a desired transmit channel in band HB TX. Transceiver 90 may include receiver 106 for receiving signals in both downlink bands LB RX (e.g., 734-746 in the FIG. 2 example) and HB RX (e.g., 746-756 MHz in the FIG. 2 example). Receiver 106 may include tuning circuitry that tunes over all of the frequencies within bands LB RX and HB RX, thereby allowing receiver 106 to tune to any incoming channel in either band LB RX or band HB RX. Paths 182, 180, and 184 may form transceiver ports for transceiver 90.

Transmitter 102 may receive data for transmission via input path 104 and may provide corresponding radio-frequency data signals for transmission at output 114. Optional power amplifier 116 and optional power amplifier 118 may be interposed between output 114 of transmitter 102 and terminal (triplexer port) 120 of triplexer 178. Transmitter 110 may receive data for transmission via input path 112 and may provide corresponding radio-frequency data signals for transmission at output 128. Optional power amplifier 130 and optional power amplifier 132 may be interposed between output 128 of transmitter 102 and terminal 134 (triplexer port) of triplexer 178.

Receiver 106 may have an input 122. One or more optional low-noise amplifiers such as amplifier 124 may be interposed between terminal 126 (triplexer port) of triplexer 178 and input 122 of receiver 106. Receiver 106 may tune to a desired channel within the LB RX and HB RX bands and may provide a corresponding received output signal at output 108.

Triplexer 178 may include filters 140 and coupling network (combining network) 176. Network 176 may include circuitry such as inductors 154, 156, and 158 that is used in combining outgoing signals from paths 144, 148, and 152 onto a single path such as path 160A and that is used in splitting incoming signals from path 160A into respective paths 144, 148, and 152. Filter elements may be interposed between filter terminals 120, 126, and 134 and respective filter terminals 144, 148, and 152. For example, filter 142 may be interposed between terminals 120 and 144, filter 146 may be interposed between terminal 126 and terminal 148, and filter 150 may be interposed between terminal 134 and terminal 152. Filter 142 may pass signals in band LB TX, filter 146 may pass signals in adjacent bands LB RX and HB RX, and filter 150 may pass signals in band HB TX. Filter 142 may be a low pass filter (e.g., a filter that passes signals below frequency 716 MHz and blocks other frequencies) or a bandpass filter (e.g., a filter that passes signals in the range of 704-716 MHz and blocks signals at frequencies outside of this range). Filter 146 may be a bandpass filter (e.g., a filter that passes signals in the range of 734-756 MHz and blocks signals at frequencies outside of this range). Filter 150 may be a high pass filter (e.g., a filter that passes signals at frequencies above 777 MHz and blocks signals below 777 MHz) or a bandpass filter (e.g., a filter that passes signals in the range of 777-787 MHz while blocking frequencies outside of this range). Triplexer 178 may be implemented using a surface acoustic wave (SAW) device, a bulk acoustic wave (BAW) device, or a device using other suitable types of filtering technology.

Terminals 144, 148, and 152 are coupled to terminal 160A of triplexer 178 by circuitry 176. Terminal 160A may be connected to one of ports 160 in switching circuitry 162. Switching circuitry 162 may be implemented by a switch or switches having multiple terminals such as terminals 160A, 160B, 160C, and 160D each of which may be selectively connected to path (terminal) 166. Path 166 may be coupled to antenna 40. The state of switching circuitry 162 may be controlled by storage and processing circuitry 28, which may supply a control signal to control input 164 of switching circuitry 162.

The control signal may, for example, be used to place switching circuitry 162 into different configurations depending on the communications band that is currently being used by device 10. If for example, radio-frequency signals are being transmitted or received in one of the communications bands handled by triplexer 178, switching circuitry 162 may be configured to connect terminal 160A to terminal 166. If, however, radio-frequency signals are being transmitted or received in a different band (e.g., a band handled by duplexer 168), switching circuitry 162 may be directed to connect path 166 to a different terminal (e.g., terminal 160D). Duplexer circuit 168 may be used to transmit signals from path 172 to path 160D using one of two bandpass filters 170 and may be used to convey received signals from terminal 160D to terminal 174 using the other one of bandpass filters 172. Other filter circuits may be selectively coupled to other terminals 160 to handle additional bands.

The use of wireless circuitry such as wireless circuitry 34 of FIG. 3 may help to reduce the number of transceiver and switch ports that are used in device 10 and may help reduce the size and complexity of the filter circuitry in circuitry 136. For example, the number of ports (switch terminals) associated with switching circuitry 162 may be minimized, because signals for four bands (LB TX, LB RX, HB RX, and HB TX) are conveyed through a single switch terminal (i.e., switch terminal 160A). Reductions in the number of ports (switch terminals) that are used in switching circuitry 162 tend to reduce insertion losses associated with switching circuitry 162, because switches with fewer ports and correspondingly fewer throws exhibit lower insertion losses than switches with more ports and more throws. Reception quality at the receiver circuits in transceiver circuitry 90 can be improved, because there is less loss in the path between antenna 40 and transceiver 90 when receiving signals. Reductions in insertion losses for switching circuitry 162 can also improve battery life, because reduced losses in the output path between transceiver 90 and antenna 40 allow the transmit power for transceiver 90 to be lowered for a given radiated power level.

Transceiver port count may be minimized by conveying signals for multiple adjacent receive bands (i.e., both LB RX and HB RX) over a single port (i.e., the port associated with path 180). Transmit signals for bands LB TX and HB TX may be handled using ports 182 and 184, respectively, so a total of three transceiver ports are used in handling signals for four bands (LB TX, LB RX, HB RX, and HB TX).

Triplexer 140 may be more compact and may be less costly than filter circuitry based on duplexers or other filter elements. To ensure satisfactory performance when simultaneously transmitting and receiving signals, filter 146 preferably reduces out-of-band signals significantly (e.g., by 40 dB or more, by 45 dB or more, or by 50 dB or more).

In a typical operating scenario, device 10 is placed in either a first operating mode in which signal bands LB TX and LB RX are used (i.e., when communicating with a network that is associated with a first carrier) or a second operating mode in which signal bands HB TX and HB RX are used (i.e., when communicating with a network that is associated with a second carrier).

A user may, for example, desire to roam between two networks when traveling. When the user is in one location, the user may use the first carrier. When the user is in another location, the user may use the second carrier (as an example). Device 10 may sense the location of device 10 (e.g., using GPS location information, network location information, or user-supplied location information) and may automatically select an appropriate carrier to use or device 10 may be informed of an available carrier by wireless information received from the carrier or manual input.

Based on information on which carrier and/or frequencies are available, device 10 can use storage and processing circuitry 28 to configure switch 162 and transceiver 90. For example, if band HB is to be used to communicate with the first carrier, switch 162 can be placed in position 160A and transceiver 90 can be directed to activate transmitter 110 and receiver 106. If band LB is to be used to communicate with the second carrier, switch 162 can be placed in position 160A and transceiver 90 can be directed to activate transmitter 102 and receiver 106. If other carriers and communications bands are to be used, the position of switch 162 may be adjusted to connect a different one of terminals 160 to path 166 and transmitters 102, 106, and 110 may be temporarily not used.

By using filter elements with satisfactory out-of-band signal rejection properties, signal leakage during simultaneous transmission and reception operations may be avoided. For example, if transmitter 102 is active and transmitting signals in band LB TX, the ability of filter 146 to reject out-of-band signals by at least 50 dB (or by 40 dB, 45 dB, or other suitable amount) will ensure that signals in band LB RX will be received with less than 50 dB (or less than 40 dB, 45 dB, or other suitable amount) of signal leakage from band LB TX. Likewise, if transmitter 110 is active and transmitting signals in band HB TX, the ability of filter 146 to reject out-of-band signals by at least 50 dB (or by 40 dB, 45 dB, or other suitable amount) will ensure that received signals in band HB RX will contain less than 50 dB (or less than 40 dB, 45 dB, or other suitable amount) of signal leakage from band HB TX.

The foregoing is merely illustrative of the principles of this invention and various modifications can be made by those skilled in the art without departing from the scope and spirit of the invention. The foregoing embodiments may be implemented individually or in any combination.

What is claimed is:

1. Wireless circuitry, comprising:
   a radio-frequency transceiver circuitry having at least first, second, and third ports, wherein the radio-frequency transceiver circuitry comprises a first transmitter that transmits signals through the first port in an first uplink frequency range associated with a first communications band, a second transmitter that transmits signals through the second port in a second uplink frequency range associated with a second communications band, and a receiver that receives signals through the third port in a first downlink frequency range associated with the first communications band and a second downlink frequency range associated with the second communications band;
   at least one antenna; and
   circuitry coupled between the antenna and the first, second, and third ports of the radio-frequency transceiver, wherein the circuitry comprises a triplexer having a terminal coupled to the antenna and having triplexer ports respectively coupled to the first, second, and third ports of the radio-frequency transceiver and wherein the triplexer comprises first, second, and third bandpass filters.

2. The wireless circuitry defined in claim 1 wherein the first and second downlink frequency ranges are adjacent to one another and wherein the circuitry that is coupled between the antenna and the first, second, and third ports comprises filter circuitry that supplies signals in the first downlink frequency range and the second downlink frequency range to the third port.

3. The wireless circuitry defined in claim 1 wherein the first communications bands ranges from 704 MHz to 746 MHz, wherein the second communications band ranges from 746 MHz to 787 MHz, and wherein the circuitry that is coupled between the antenna and the first, second, and third ports comprises filter circuitry that supplies signals in the first downlink frequency range and the second downlink frequency range to the third port.

4. The wireless circuitry defined in claim 3 wherein the first uplink frequency range is 704 MHz to 716 MHz, wherein the first downlink frequency range is 734 to 746 MHz, wherein the second uplink frequency range is 777 MHz to 787 MHz, wherein the second downlink frequency range is 746 MHz to 756 MHz, and wherein the filter circuitry is configured to receive signals in the first uplink frequency range from the first port and is configured to receive signals in the second uplink frequency range from the second port.

5. The wireless circuitry defined in claim 4 wherein the first and second downlink frequency ranges are mutually exclusive.

6. The wireless circuitry defined in claim 5 wherein the first bandpass filter is coupled to the first port, the second bandpass filter is coupled to the second port, and the third bandpass filter is coupled to the third port.

7. The wireless circuitry defined in claim 6 wherein the first bandpass filter is configured to pass signals ranges from 704 MHz to 716 MHz, wherein the second bandpass filter is configured to pass signals ranging from 777 MHz to 787 MHz, and wherein the third bandpass filter is configured to pass signals ranging from 734 MHz to 756 MHz.

8. The wireless circuitry defined in claim 7 further comprising switching circuitry interposed between the antenna and the triplexer.

9. The wireless circuitry defined in claim 1 wherein the first and second downlink frequency ranges are mutually exclusive.

10. The wireless circuitry defined in claim 9 wherein the first bandpass filter is coupled to the first port, the second bandpass filter is coupled to the second port, and the third bandpass filter is coupled to the third port.

11. The wireless circuitry defined in claim 10 wherein the first bandpass filter is configured to pass signals ranges from 704 MHz to 716 MHz, wherein the second bandpass filter is configured to pass signals ranging from 777 MHz to 787 MHz, and wherein the third bandpass filter is configured to pass signals ranging from 734 MHz to 756 MHz.

12. The wireless circuitry defined in claim 11 further comprising switching circuitry interposed between the antenna and the triplexer.

13. A method for wirelessly communicating using an electronic device having a radio-frequency transceiver with first, second, and third transceiver ports, a triplexer having first, second, and third triplexer ports coupled respectively to the first, second, and third transceiver ports of the radio-frequency transceiver and having an additional triplexer port coupled to an antenna, the method comprising:
   in a first mode of operation, transmitting signals in a first uplink frequency band through the first transceiver port, the first triplexer port, the additional triplexer port, and the antenna and receiving signals in a first downlink frequency band through the antenna, the additional triplexer port, the second triplexer port, and the second transceiver port; and
   in a second mode of operation, transmitting signals in a second uplink frequency band through the third transceiver port, the third triplexer port, the additional triplexer port, and the antenna and receiving signals in a second downlink frequency band through the antenna, the additional triplexer port, the second triplexer port, and the second transceiver port, and wherein the triplexer includes first, second, and third bandpass filters.

14. The method defined in claim 13 wherein the first downlink frequency band includes frequencies between a first frequency and a second frequency that is greater than the first frequency, wherein the second downlink frequency band includes frequencies between a third frequency and a fourth frequency that is greater than the third frequency, and wherein the third frequency is greater than or equal to the second frequency, wherein the first downlink frequency band and the second downlink frequency band are adjacent, and wherein receiving signals in the first and second downlink frequency bands comprises receiving the first and second downlink frequency bands through the second bandpass filter.

15. Wireless circuitry, comprising:
a radio-frequency transceiver circuitry having at least first, second, and third ports, wherein the radio-frequency transceiver circuitry comprises a first transmitter that transmits signals through the first port in an first uplink frequency range associated with a first communications band, a second transmitter that transmits signals through the second port in a second uplink frequency range associated with a second communications band, and a receiver that receives signals through the third port in a first downlink frequency range associated with the first communications band and a second downlink frequency range associated with the second communications band;
at least one antenna; and
a triplexer having a terminal coupled to the antenna and having triplexer ports respectively coupled to the first, second, and third ports of the radio-frequency transceiver, wherein the triplexer comprises:
a plurality of bandpass filters, each of which is coupled to a respective one of the first, second, and third ports.

16. The wireless circuitry defined in claim 15 wherein the first uplink frequency range includes frequencies higher than any frequencies in the first and second downlink frequency ranges, wherein the second uplink frequency range includes frequencies lower than any frequencies in the first and second downlink frequency ranges.

17. The wireless circuitry defined in claim 16 further comprising switching circuitry interposed between the antenna and the triplexer.

18. The wireless circuitry defined in claim 16 wherein the bandpass filters in the triplexer comprise first, second, and third bandpass filters, wherein the first bandpass filter is coupled to the first port, the second bandpass filter is coupled to the second port, and the third bandpass filter is coupled to the third port, wherein the first bandpass filter is configured to pass signals ranging from 777 MHz to 787 MHz, wherein the second bandpass filter is configured to pass signals ranges from 704 MHz to 716 MHz, and wherein the third bandpass filter is configured to pass signals ranging from 734 MHz to 756 MHz.

19. The wireless circuitry defined in claim 18 wherein the first and second downlink frequency ranges are adjacent to one another and wherein the triplexer further comprises a plurality of inductors, each of which is coupled between a respective one of the bandpass filters and the terminal of the triplexer that is coupled to the antenna.

\* \* \* \* \*